United States Patent [19]
McCabe

[11] Patent Number: 5,599,172
[45] Date of Patent: Feb. 4, 1997

[54] WIND ENERGY CONVERSION SYSTEM

[76] Inventor: Francis J. McCabe, #6 Bunker Hill Rd., Ottsville, Pa. 18942

[21] Appl. No.: 507,129

[22] Filed: Jul. 31, 1995

[51] Int. Cl.$^6$ .................................................... F04B 17/02
[52] U.S. Cl. ........................... 417/334; 415/2.1; 415/4.3
[58] Field of Search ........................... 417/334; 415/2.1, 415/4.3, 4.5, 905, 908

[56] References Cited

U.S. PATENT DOCUMENTS

| | | | |
|---|---|---|---|
| 4,021,135 | 5/1977 | Pedersen et al. | 415/2 |
| 4,055,950 | 11/1977 | Grossman | 60/398 |
| 4,075,500 | 2/1978 | Oman et al. | 415/4.3 |
| 4,143,992 | 3/1979 | Crook | 415/2 |
| 4,204,799 | 5/1980 | De Geus | 415/2 |
| 4,236,083 | 11/1980 | Kenney | 290/55 |
| 4,447,738 | 5/1984 | Allison | 290/44 |
| 4,720,640 | 1/1988 | Anderson et al. | 415/4.3 |
| 4,784,570 | 11/1988 | Bond | 417/334 |
| 5,332,354 | 7/1994 | Lamont | 415/2.1 |
| 5,457,346 | 10/1995 | Blumberg et al. | 415/4.3 |

FOREIGN PATENT DOCUMENTS

| | | | |
|---|---|---|---|
| 365045 | 9/1906 | France | 415/2.1 |

Primary Examiner—Timothy Thorpe
Assistant Examiner—Peter G. Korytnyk
Attorney, Agent, or Firm—Frank J. Benasutti

[57] ABSTRACT

A wind energy conversion system employs a wind turbine means mounted on a frame, said wind turbine having a venturi configured shroud with a core and a plurality of blades fixedly mounted between the core and the throat of the venturi. The blades have an air foil design consisting essentially of an inverted pan-shaped, cross-sectional configuration to create high torque at low air speed.

7 Claims, 6 Drawing Sheets

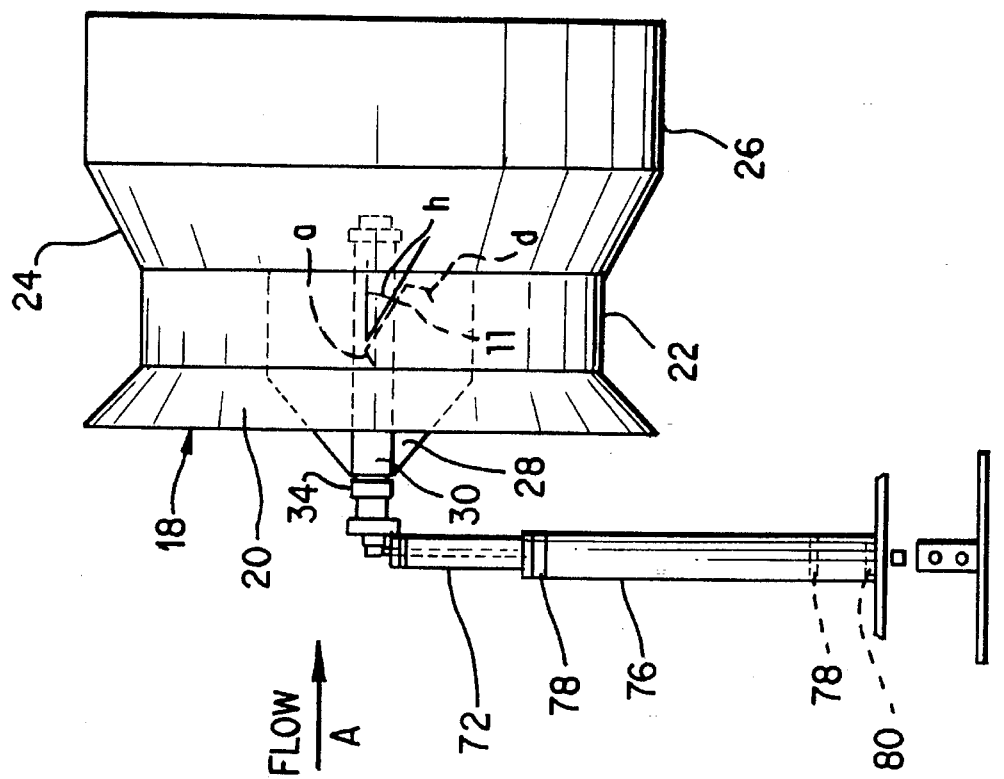
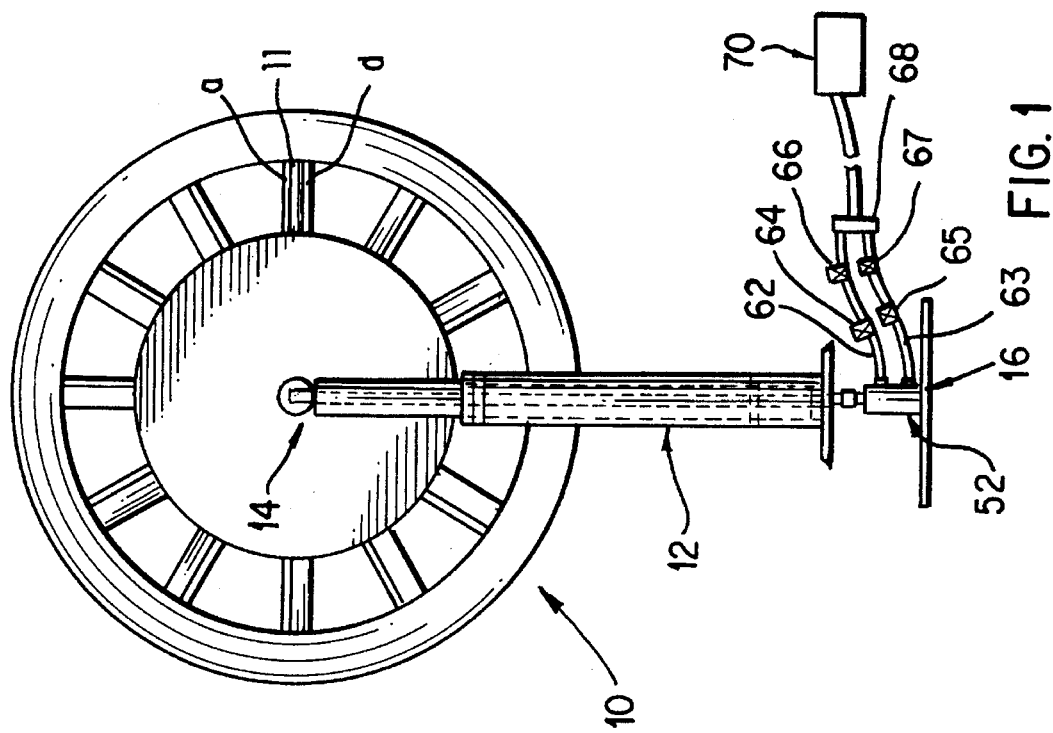

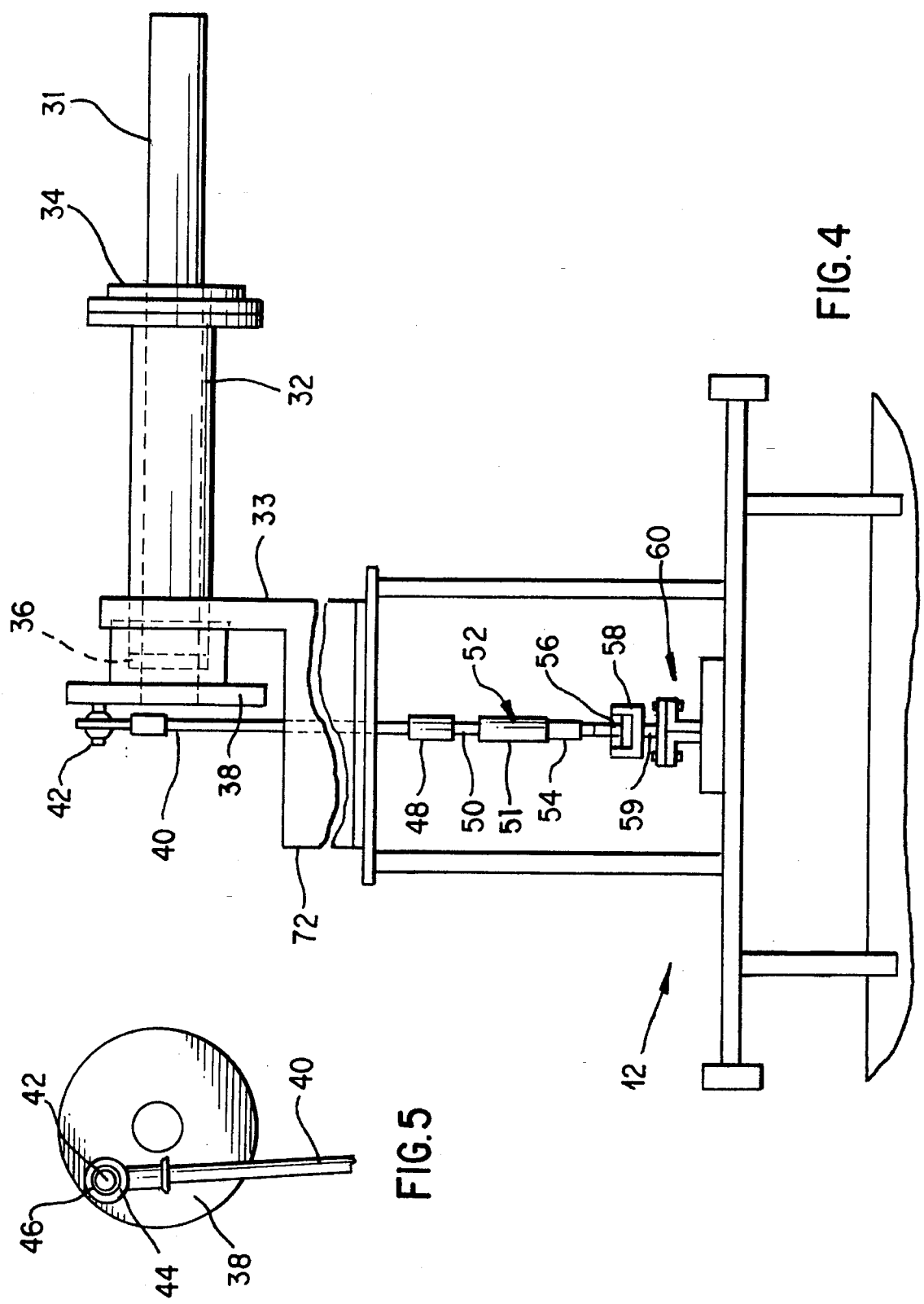

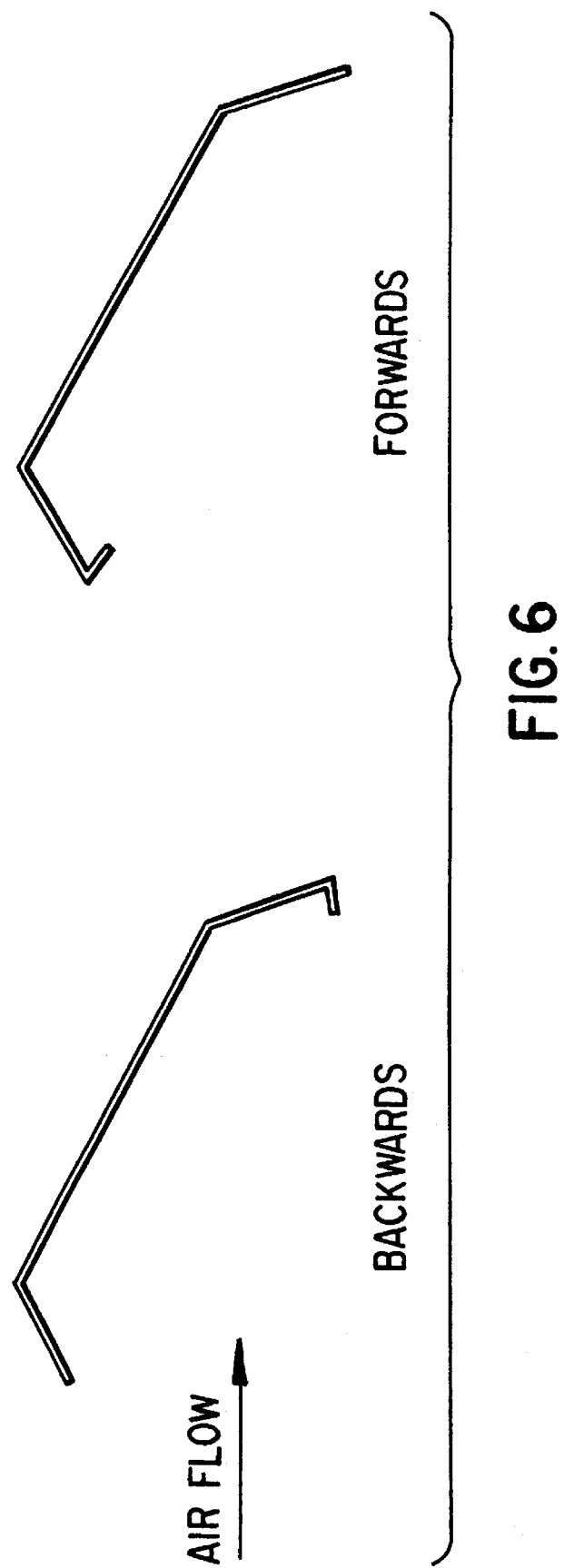

5,599,172

WIND ENERGY CONVERSION SYSTEM

TECHNICAL FIELD

This invention relates to improvements in wind energy conversion systems, such as windmills; and more particularly to systems used to convert energy into stored pneumatic power; that is, compressed air.

BACKGROUND ART

In the prior art, it was known to use windmills with air compressor units that are powered by the wind energy turning the windmill, to store air under pressure for use, for example, in generating electricity. See for example U.S. Pat. Nos. 4,055,950; 4,236,083 and 4,447,738.

Windmill type designs have also been used in wind turbines with various shaped impeller blades and angles encased in a cowling designed to direct the wind over the blades. See for example U.S. Pat. Nos. 1,025,428; 4,021,135; 4,140,433; 4,132,499; 4,143,992; 4,324,985 and 4,720,640.

One of the primary goals of the prior art configurations was to get more revolutions per minute (rpm) out of the device. Thus, the blade configurations were such as to pass air quickly through the device. To do this, the blades would be so configured and positioned as to not interfere with each other's air flow.

One of the problems with prior art devices was that in sustained high winds they would tend to "run away" and burn up. Furthermore, at low winds or intermittent winds, they could not produce the sustained energy, i.e. constant speed, necessary to produce, for example, electricity.

DISCLOSURE OF THE INVENTION

SUMMARY OF THE INVENTION

I have invented a new wind energy conversion system for particular application to stored energy, such as compressed air. In accordance with my invention, energy is extracted from the air movement at low speeds. The configuration of the blades and the device which supports them is such that there is an interaction between adjacent blades to provide more torque at slower speeds. In accordance with my device, I collect as much air as possible within the device rather than pass it through quickly, and thus I collect as much force as possible. Further, the shape, positioning and configuration of the blades within the device tend to prevent it from running away; in other words, there is actually a braking effect.

BRIEF DESCRIPTION OF DRAWINGS

FIG. 1 is a front view of the most preferred embodiment of my invention;

FIG. 2 is a side view of the embodiment shown in FIG. 1;

FIG. 4 is an enlarged view, partially broken away, of portions of the apparatus shown in FIGS. 1 and 2;

FIG. 5 is an end view of a portion of the apparatus shown in FIG. 4;

FIG. 6 is a schematic view showing alternate positioning of the blade shown in FIG. 3;

FIGS. 7j–7p are a schematic view of cross-sections of various blade configurations;

DESCRIPTION OF THE PREFERRED EMBODIMENT

Figure 3:
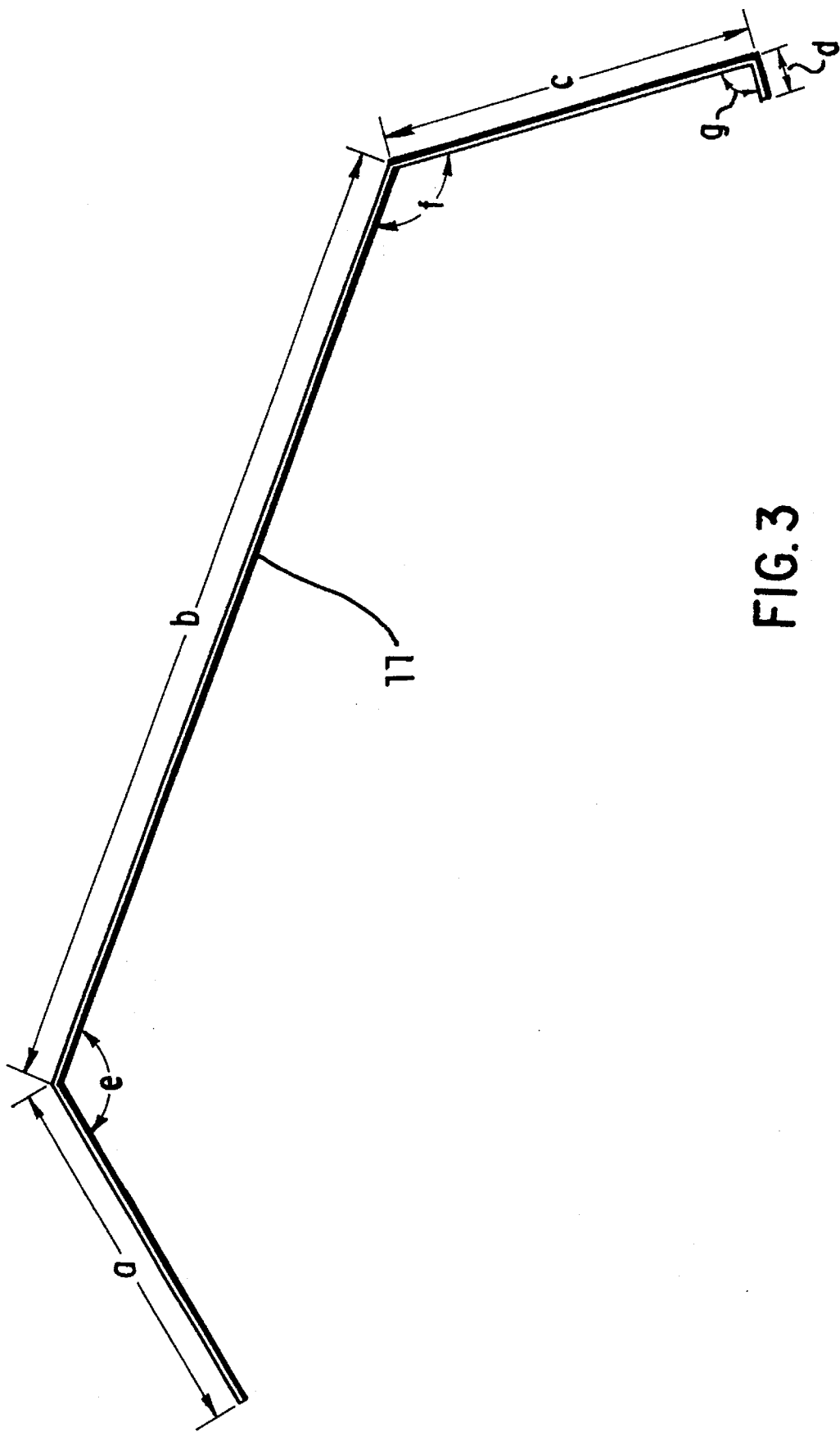
FIG. 3 is an enlarged cross-sectional view of a blade used in the invention disclosed in FIGS. 1 and 2.

Referring to the Figures, FIG. 1 shows a front elevation of a device in accordance with my invention which comprises a wind turbine means, designated generally 10 mounted for rotation on a frame and mounting means designated generally 12 and connected by a transmission means designated generally 14 to an air compression means designated generally 16 for converting wind energy into compressed air.

The basic physical elements comprising the wind turbine means include the shroud means designated generally 18 shown in FIG. 2 which is generally in the shape of a venturi. The shroud has an intake section 20, a throat section 22, an exhaust section 24 and a trailing edge section 26.

To facilitate the mounting of the wind turbine means, including the mounting of the blades, an internal core 28 is provided. As will be understood from FIG. 2, the surfaces of the core define a venturi with the surfaces of the shroud; so that the provision of the core within the shroud effectively provides a torroid/venturi. The core and the shroud are preferably made of a sheet metal such as aluminum. The core has as an integral part thereof an axially shaft 30 which is mounted on the mill shaft 31, FIG. 4 to rotate therewith. A support arm 32, which is part of the frame and mounting means 12, is welded to and extends from the vertical flange 33 of the vertical support shaft 72. The shaft 31 is mounted for rotation in the arm 32, as by means of roller bearings 34, 36, shown in FIG. 4 and is retained axially therein by any suitable means (not shown, but conventional per se). The rotatable shaft 30 terminates in a crank plate 38 shown in FIG. 4 which is fixedly connected thereto to rotate therewith. The crank plate is used to drive a connecting rod 40. To this end a pin 42 is fixedly mounted in the crank plate 38 and an eye 44 is fixedly mounted on the end of the connecting rod 40. A bearing 46 is mounted between the pin 42 and the eye 44 to provide for rotation therebetween. Thus, in operation when the shafts 30, 31 rotate, the crank plate 38 rotates and the connecting rod 40 oscillates and is driven vertically.

The other end of the connecting rod 40 is coupled by the coupling 48 shown in FIG. 4 to the piston rod 50 of a double acting air piston/cylinder means designated generally 52. The piston/cylinder means 52 is mounted by a shaft 54, to a universal joint comprising a pivotable arm 56 retained in a yoke 58 which is mounted by any suitable means designated generally 60, to a part of the frame and mounting means 12. Thus, in operation as the shaft 30 rotates and the connecting rod 40 reciprocates, the piston rod 50 reciprocates in the air cylinder 51 of piston/cylinder means 52 to compress air. It will be appreciated from what has been described that the rod 40 is oscillating or swinging back and forth as it reciprocates and the pivotable arm 56 and yoke 58 accommodate and facilitate that movement.

It will further be appreciated that the positioning of the pin 42 in the crank plate 38 could be varied, as well as the diameter of the crank plate, to vary the stroke of the connecting rod 40 as desired.

The double acting air piston/cylinder means 52 compresses air on both the upstroke and down stroke of the rod 50 by any suitable means such as the arrangement shown in FIG. 1. This arrangement comprises pneumatic tubes 62, 63, intake check valves 64, 65, directional flow control valves 66, 67, manifold tubing 68, and connecting tubing and valve means communicating with a compressed air storage means designated generally 70 (not shown in detail, but conventional per se) for collecting and dispensing compressed air.

To accommodate the direction in which the wind is blowing, the entire structure is pivotable. This is accomplished by having the vertical support shaft 72 rotate within the support cylinder 76; utilizing the bearings 78 and thrust bearing 80. As the direction of the wind changes, the shaft 72 will rotate. The cylindrical trailing edge section 26 controls this rotation depending upon the air flow shown by the arrow A in FIG. 2. As the shaft 72 rotates, the yoke 58 rotates about the support pin 59 FIG. 4 to aid in accommodating this movement.

Referring now to FIGS. 1, 2, 3, 6 and 7, I will describe in detail the blade means. The most preferred structure of a blade 11 in accordance with this invention is that shown in FIG. 3. As an example of the exact measurement and construction of this blade the dimensions are as follows: the leading edge a=4"; the planar face portion b=11.5"; the trailing edge c=4.125"; the flange d=0.562"; angle e is 130°; angle f is 127°; angle g is 90°. The material used is 11 gauge aluminum.

The cross-sectional shape of this blade shows that it comprises essentially a planar face portion b and leading a and trailing c edges associated with opposite ends of said face portion, such that the cross-sectional shape is an inverted pan-shaped enclosure.

This blade can be mounted either forwards or backwards in the wind turbine means 10; as those terms can be understood from the illustration in FIG. 6. It has been determined from experiments that the backwards position (FIGS. 1, 2, and 3) is preferred.

The blades are fixedly mounted between the shroud 18 and the core 28 in the throat section 22. In actual tests, fourteen blades were used in an eight foot windmill. Tests were conducted at various speeds. The blades were spaced approximately one foot apart on angles varying between 6 and 45 degrees (see angle h in FIG. 2). In the unit tested with blades at 36 degrees, 7 mph was needed to overcome inertial forces and start the windmill turning. A wind of 3 mph was necessary to maintain its rotation. When blade angles were increased, threshold speeds were higher and running speeds increased. Thus, it was determined that the optimum blade setting for low winds seemed to be better at shallower angles.

It is theorized that the preferred blade shape and positioning captures air rather than letting it pass freely through the apparatus. This has two effects. First, it causes aerodynamic lift. Secondly, the adjacent blade can enhance the lift. This device operates best with the airfoils at significantly shallower angles (h) than windmills using standard airfoils. Thus, the device will not continuously accelerate and burn up because the relative wind change do to rotation reduces lift acting as a braking action as the angle of attack approaches the zero lift range. In operation, this means that the device collects as much force as possible, even though it is going slower rather than faster; as in the prior art. For example, at a 60 to 65 mph wind, the maximum speed would be approximately 100 revolutions per minute (rpm).

It has been observed that with less blades there is greater speed, while, in this device, with more blades there is more torque and lower speed.

Figure 7J:
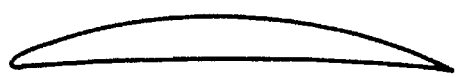
Figure 7K:
Figure 7L:
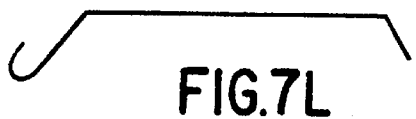
Figure 7M:
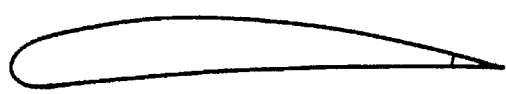
Figure 7N:
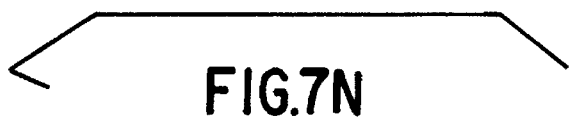
Figure 7P:
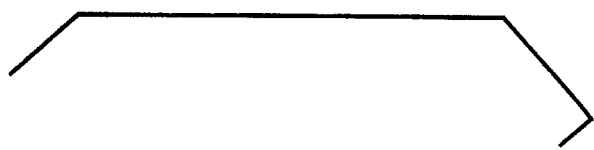

A number of standard blade shapes, as shown by the shapes illustrated schematically in FIGS. 7s–7p, were tested using a wind tunnel. The blades shown from the top are: blade J, an ordinary air foil carved from balsa wood; a fan blade air foil made of plastic, K; an air foil blade of the type shown in U.S. Pat. No. 4,655,122, L; an air foil with a flap at the back as shown in M; a forward mounted air foil as shown in N; and a backwardly mounted air foil shown in P.

Experiments focused on the torque enhancement from air flow inducement provided by windmills and blades or "air dams" which were designed to harness the most force possible from a given air flow. Blades were selected for their ability to maximize force. Tests were conducted to establish a relationship between air mass flow and volume stored under pressure (density). The object was to determine the spacing and fluid flow interaction between blades which would yield the most force, thus determining the number of blades to be used in the windmill. For preliminary testing, it was decided to use fourteen blades in an eight foot windmill. A total of seventeen blade prototypes were made and bested. The drawings, FIGS. 7s–7p, show a representative sample of blade configurations.

The testing involved several steps. First, each blade was installed at a specified angle (the installment angle range was 20° through 35° at intervals of 5°; and sometimes included readings at 15°). The blades were balanced to insure equilibrium prior to starting the air flow. With the wind on, two measurements were taken: maximum upward force and optimum angle at which the maximum force occurred. Testing progressed with three things in mind:

1. Optimum position (forward or backward for either or both blades);

2. Spacing between blades that would yield the highest force readings; and

3. The angle of the blades which would yield the highest force readings.

The most important relationship found in this testing concerned the spatial arrangement of the blades. It is theorized that while blade position is not the most important factor concerning the pattern of force reading; it is a very important factor in the magnitude of the force readings. Thus, it was determined that the highest force readings occurred when both blades, positioned in a wind tunnel test where one was mounted over another, were in the backward position; with a spacing of 70 to 75% of chord length.

Figure 9:
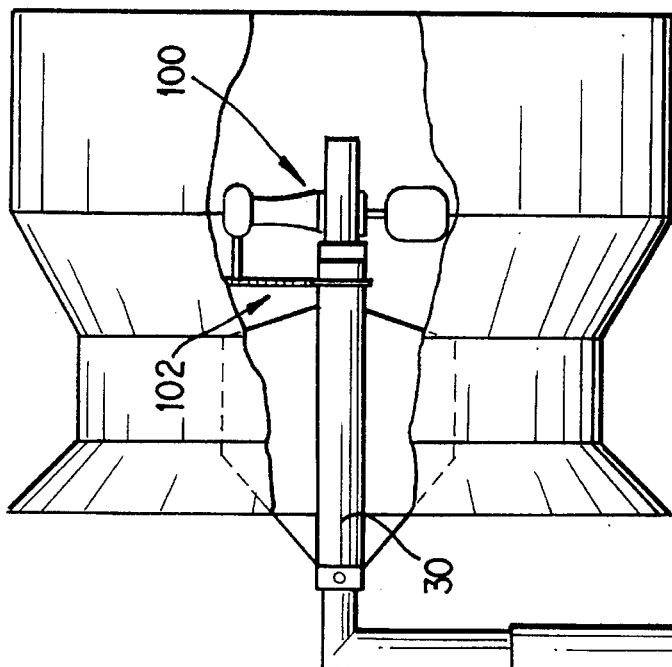
FIG. 9 is a side view of the alternate embodiment shown in FIG. 8.
Figure 8:
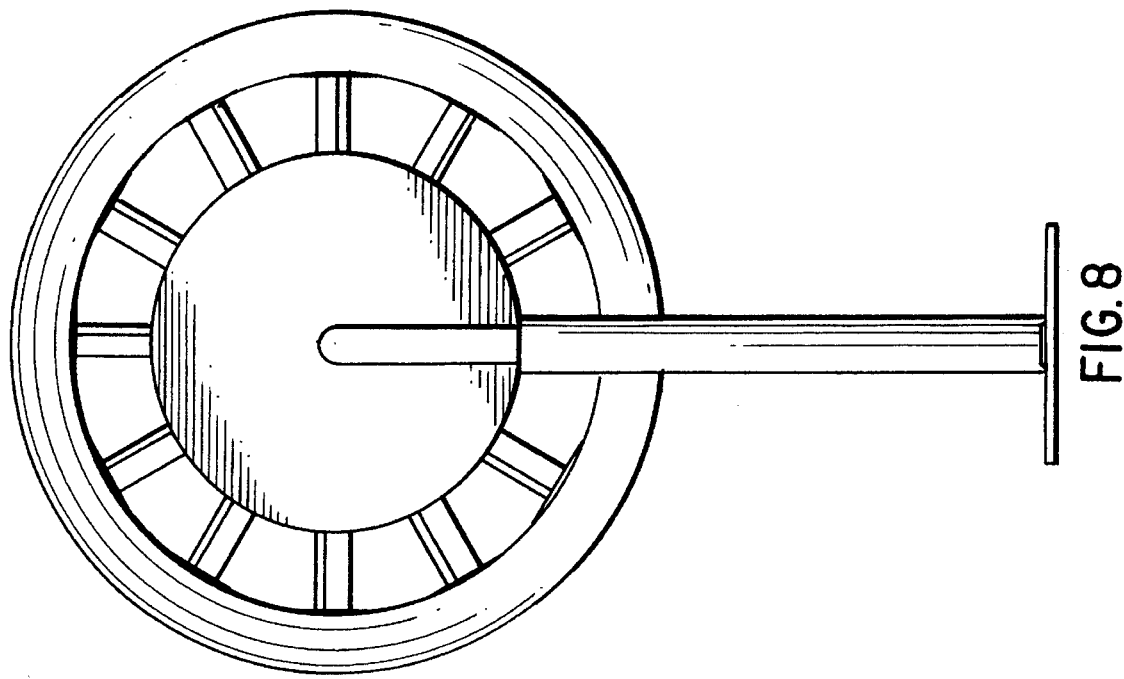
FIG. 8 is a front view of an alternate embodiment of my invention.

FIGS. 8 and 9 show an alternative embodiment of my invention in which the air compression means designated generally 100 can be directly attached by means of a belt drive means 102 to the shaft 30 and fixedly mounted in any suitable way to the support structure, so that as the shaft 30 turns, the belt means 102 compresses air.

From what has been described, it will be appreciated that I have invented a new type of wind energy conversion apparatus which is highly efficient for converting wind energy into useful power. While most wind machines are designed to either pump water or produce electricity, my system is meant to compress air. The air can be stored at any desired site without energy loss for an unlimited time, unlike electric storage systems which leak power and slowly lose efficiency; or water, which must be pumped to higher elevations in order to rely on the potential energy as a power source. Because air can be compressed by a machine running at any speed, variations in wind and the operation of the wind machine are not factors; unlike the direct production of electricity which requires a specific frequency. Thus, the machines of energy generation and storage are greatly simplified when using compressed air as the medium.

As a by-product of this operation, the heat generated by compressing the air can be extracted for use through heat exchangers. By doing so, the cooler air pumped into the storage tank has greater energy potential per unit volume. The heat that is generated can be used as desired, such as, for example, hot water, heating homes or even as secondary source.

What I claim is:

1. A wind energy conversion system comprising a wind turbine means, a transmission means connected to said wind turbine means for transmitting the energy from said wind turbine means to an air compression means connected to said transmission means for compressing air; said wind turbine means comprising a venturi-shaped shroud having an inner core and a plurality of blades fixedly connected between said inner core and said shroud; at least one of said blades having a cross-sectional shape comprising a planar face portion and leading and trailing edges associated with opposite ends of the face portion to form an essentially cross-sectional pan-shaped structure disposed in an inverted position.

2. The invention of claim 1 wherein the blade with the described cross-section has a flange extending from the trailing edge back toward the leading edge.

3. The invention of claim 1 wherein there are a plurality of said blades positioned at approximately 32 degree angles to the direction of air flow through said turbine means.

4. The invention of claim 1 wherein said shroud has a cylindrically shaped trailing portion extending from the trailing edge of the venturi.

5. The invention of claim 1 wherein the inner core forms a torroid with said shroud.

6. The invention of claim 1 further comprising a frame and mounting means connected to said wind turbine means for mounting said wind turbine means, a rotatable shaft connected to and axially extending from said core and mounted for rotation about its axis on an arm extending from said frame and mounting means, to rotate in response to rotation of said wind turbine means; said transmission means comprising a crank plate attached to the end of said rotatable shaft; a connecting rod connected to a pin off the axial center of said crank means and positioned for circular movement about said center; means connecting said pin to a connecting rod so that said rod can oscillate and reciprocate in response to rotation of said plate.

7. The invention of claim 6 further comprising means connecting one end of said rod to a double acting air piston/cylinder means, comprising a piston and cylinder, said piston being connected to said rod by a piston rod for moving said piston in response to the reciprocation of said connecting rod; means mounting said air piston/cylinder means such that said cylinder is both pivotable with the oscillation of said connecting rod and rotatable; support means embracing a shaft means connected to said rotatable shaft of said wind turbine means to permit rotation thereof in a support means housing said shaft means for rotation about its axis such that the direction of the wind into said wind turbine means will move said wind turbine means and rotate said shaft means.

* * * * *